(No Model.) 3 Sheets—Sheet 2.
W. H. TAYLOR.
PIGEON HOLE.
No. 408,053. Patented July 30, 1889.
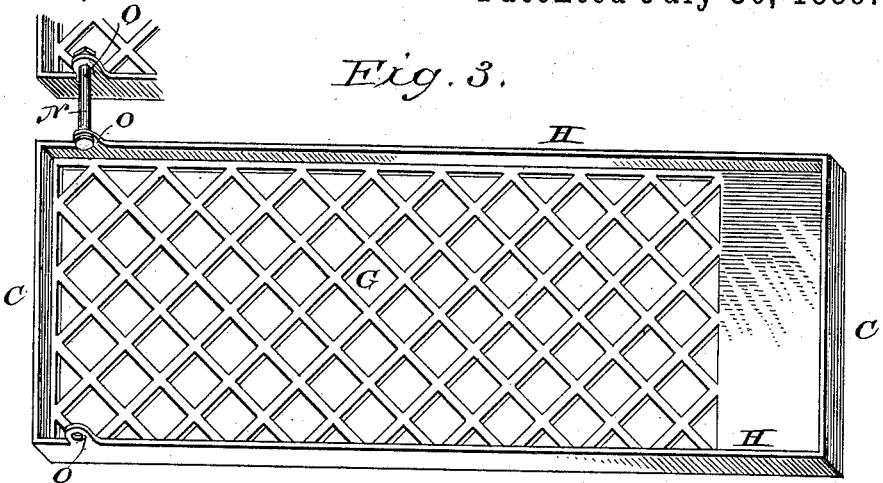
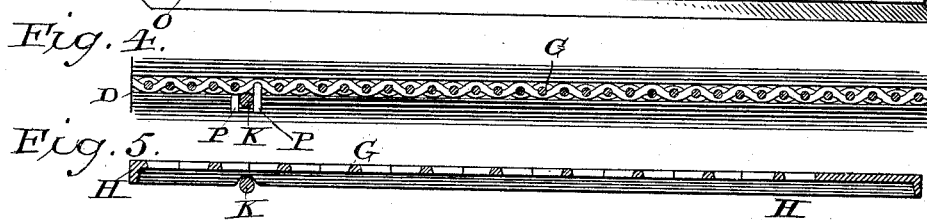
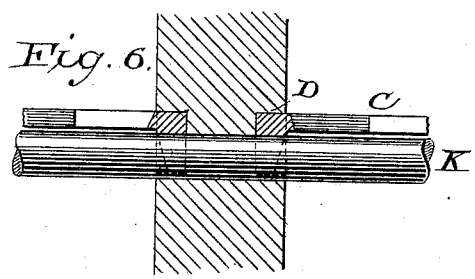
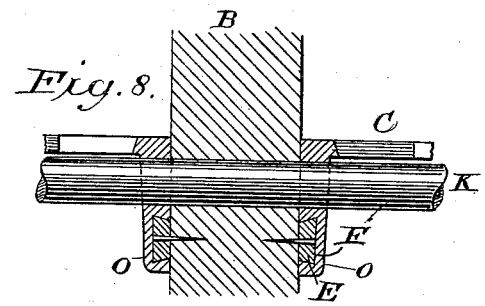
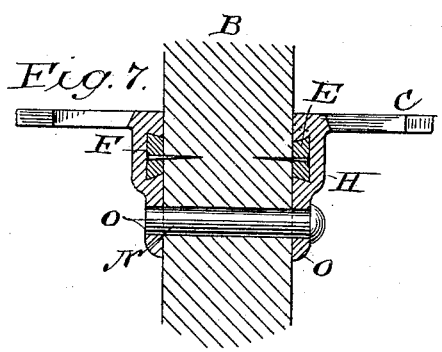
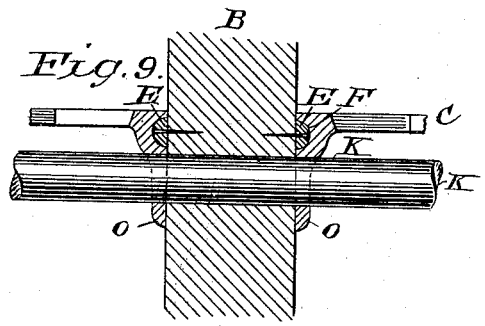
WITNESSES
H. C. Newman
Wm Musser
INVENTOR
Warren H. Taylor,
By his Attorneys
Hopkins & Atkins.

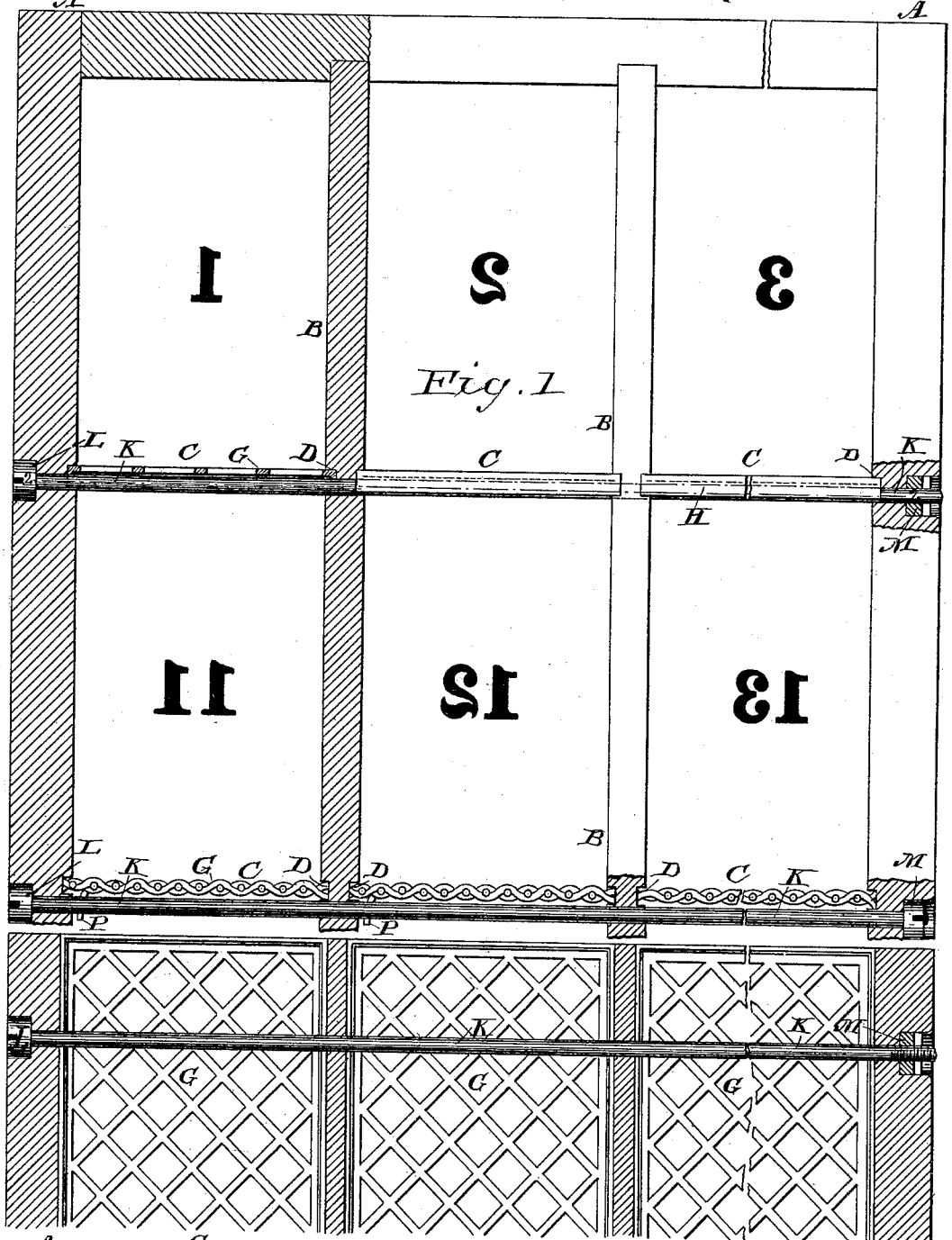

(No Model.) 3 Sheets—Sheet 3.
W. H. TAYLOR.
PIGEON HOLE.
No. 408,053. Patented July 30, 1889.
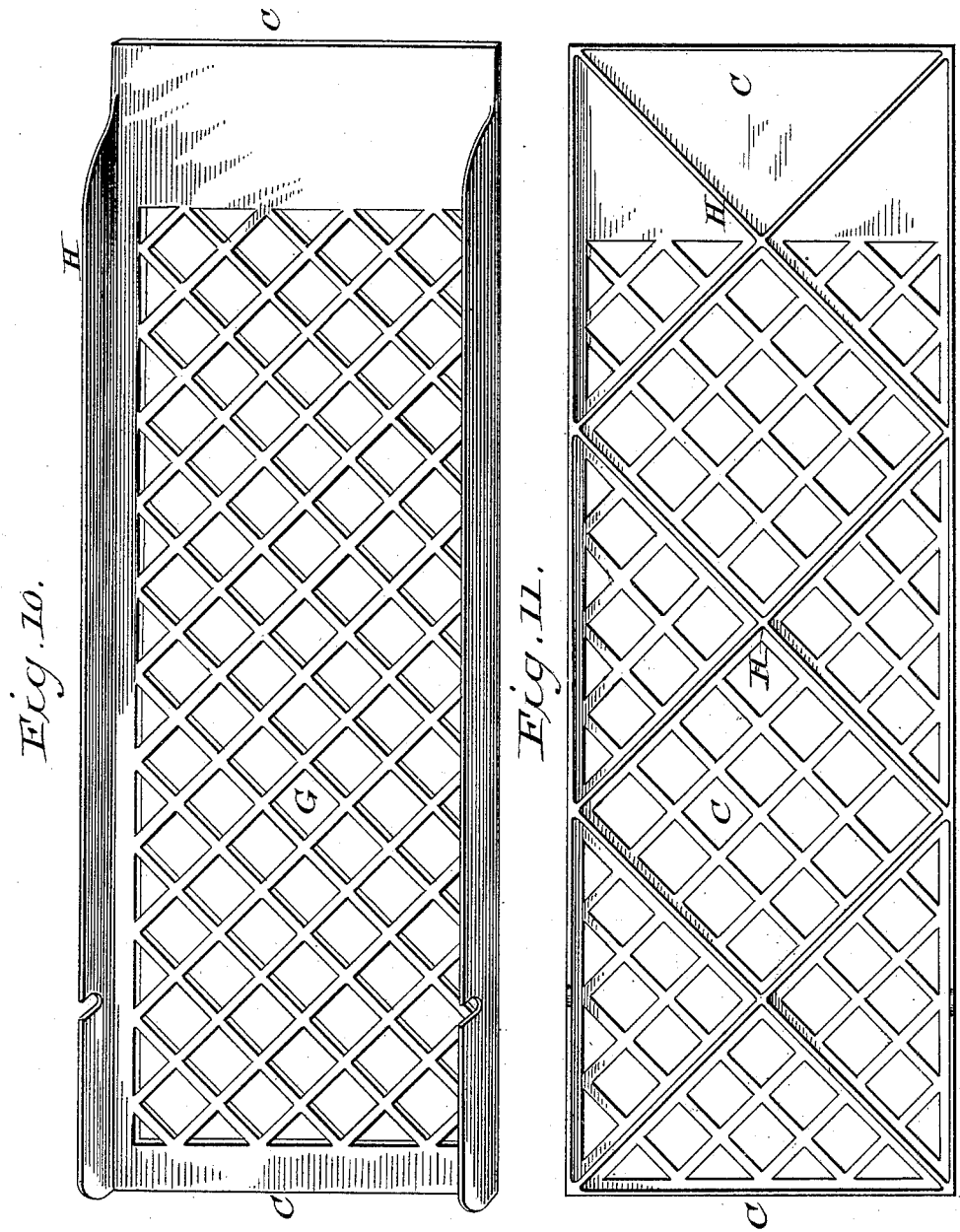
Witnesses
H. C. Newman
E. S. Newman
Inventor
Warren H. Taylor,
By
Hopkins & Atkins.
Attorneys

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

PIGEON-HOLE.

SPECIFICATION forming part of Letters Patent No. 408,053, dated July 30, 1889.

Application filed January 12, 1889. Serial No. 296,179. (No model.)

*To all whom it may concern:*

Be it known that I, WARREN H. TAYLOR, of Stamford, in the county of Fairfield and State of Connecticut, have invented certain new and useful Improvements in Pigeon-Holes, of which the following is a specification, reference being had to the accompanying drawings.

My improvements relate to what I will term "open-work" partitions or shelves, which may be castings, perforated plates, wire-netting, or any other kind of frame-work or plate with openings through it, suitable to form a partition that will be light, strong, and adapted to support mail-matter or other things resting upon them, and that will allow dust and dirt to fall through their openings and permit a person also to see through them.

My invention consists in certain improvements in the class of devices of this general character shown, for example, in United States Patents Nos. 70,674 and 140,092.

My invention is particularly adapted for post-office pigeon-holes, but may be used for various other purposes.

In the accompanying drawings, Figure 1 is a rear elevation, partly in section, of a nest of pigeon-holes suitable, for example, for post-office boxes. Fig. 2 is a horizontal sectional view taken on line 2 2 of Fig. 1. Fig. 3 is a bottom perspective view of one of the open-work partitions detached, showing its relative position to the adjacent one. Fig. 4 is a vertical longitudinal section through one form of open-work partition. Fig. 5 is a vertical longitudinal section through another form of open partition. Fig. 6 is a section through one of the vertical partitions, drawn on a larger scale, showing parts of the adjacent sides of the open-work partitions secured to it. Figs. 7, 8, and 9 are views similar to that of Fig. 6, except that they show slight variations in forms of projections from the open-work partitions and in means of attaching the open-work partitions to the vertical partitions. Fig. 10 is a perspective view, somewhat similar to Fig. 3, but showing the flange H not extending entirely around the open-work part. Fig. 11 is a bottom plan view showing the diagonal stiffening-ribs.

In Figs. 1 and 2, A indicates an inclosing-frame of a nest of pigeon-holes; B, the vertical partitions, which may be of wood, metal, or any other suitable material, and C the horizontal open-work partitions; but, of course, these may be used as vertical partitions, position being immaterial. The vertical partitions B are provided with grooves D or projections E, as desired, (see Figs. 7, 8, and 9,) and the open-work partitions fit into these grooves, or else are themselves provided with grooves F to receive the projections of the vertical partitions. The open-work partitions are formed of thin frame-work or net-work G, surrounded, or partly surrounded, by a thicker framing flange or stiffening H, preferably flush with the top of the open-work, but projecting below it.

It is usually more convenient to make the top of the partitions and frame flush all around; but the principal object is to have a smooth surface over which the mail-matter passes in being inserted and removed from the boxes. It is evident, therefore, that it is at the front and rear only where it is especially desirable that the net-work and frame should be flush. If preferred, the sides can project both above and below the net-work, or the surface of the net-work may be higher all around than the frame. The object of the projecting frame is to stiffen the open-work partition and to form a support for it; but it must be in such position and of such form as not to project above the surface of the net-work at the edges of the shelf or mouth of the pigeon-hole.

It is evident that the stiffening can be partially accomplished by ribs extending only part way around the edge of the partition, (see Fig. 10,) or they may be run diagonally across it, (see Fig. 11,) or be used in any of the well-known ways by which ribs or frames or flanges are used for stiffening purposes; but it is preferable to form them as shown in Fig. 3.

The open-work partitions may be readily slid into place between the partitions which cross them, whether vertical or horizontal. When in place, they should be held to prevent them from slipping out. This may be done by means of a long rod K, extending through the flange H or lugs O, as shown in Figs. 3, 7, 8, and 9, of the frames underneath the open-work partitions, and through the other partitions as shown in Figs. 1 and 2. This rod is provided at one end with a head L, and at the other end by a nut M, by which it can be strained up, so as not only to hold the open-work partitions in place and prevent their sliding out, but also to stay the vertical partitions and give firmness and solidity to the entire structure.

The open-work partitions may of course be held in place by short rods or bolts N, each passing through lugs O of only two partitions, as shown in Figs. 3 and 7. The projections P may extend down on either side of the rod K, as shown in Figs. 1 and 4. Although this construction is perhaps substantially the same in principle, it is preferable to use the long rods extending through the entire nest of pigeon-holes, as shown in Figs. 1 and 2, and strained up by screw-nuts, because they not only serve to keep the open-work partitions in place, but also bind together all the parts of the structure firmly for transportation and use.

By my improvement it will be seen that each open-work partition can be inserted in place quickly and readily secured there in a manner to strengthen an entire nest of pigeon-holes.

It will also be seen that by my improved construction of the open-work partitions I secure the maximum strength with the minimum weight of material.

What I claim is—

1. A nest of pigeon-holes, with open-work partitions secured to the partitions that cross them by means of a rod or rods which pass through the pigeon-holes and engage with two or more of the open-work partitions to retain them in place, and which tend to hold them firmly together, substantially as set forth.

2. A nest of pigeon-holes provided with open-work partitions which are held or stayed in place by fastenings engaging with their under sides, so that the upper surface of said partitions is left flush and unobstructed, substantially as set forth.

3. A nest of pigeon-holes provided with open-work partitions which are loosely held in proper relation to partitions that cross them by grooves or projections, and secured against removal by fastenings engaging with two or more open-work partitions, substantially as set forth.

4. A nest of pigeon-holes, with part of the partitions supporting their cross-partitions, which latter are loosely slid into place, and the whole nest held together by stiffening-rods, substantially as set forth.

In testimony of all which I have hereunto subscribed my name.

WARREN H. TAYLOR.

Witnesses:
SCHUYLER MERRITT,
GEO. E. WHITE.